April 28, 1942.　　　C. N. METCALF　　　2,281,366
CABLE SPEAR
Filed March 29, 1941　　　2 Sheets-Sheet 1
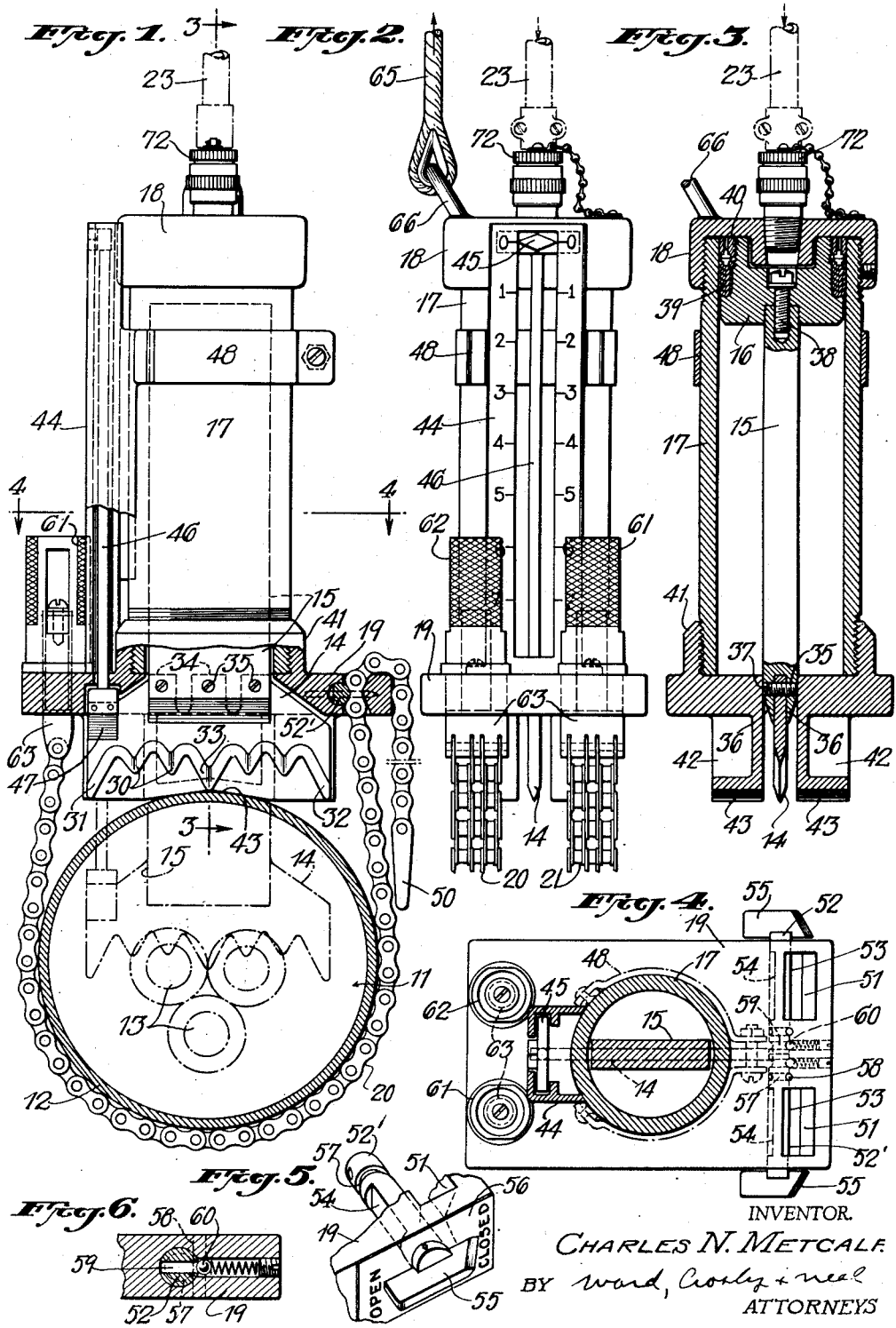
INVENTOR.
CHARLES N. METCALF
BY Ward, Crosby & Neal
ATTORNEYS April 28, 1942.　　　　C. N. METCALF　　　　2,281,366
CABLE SPEAR
Filed March 29, 1941　　　2 Sheets-Sheet 2
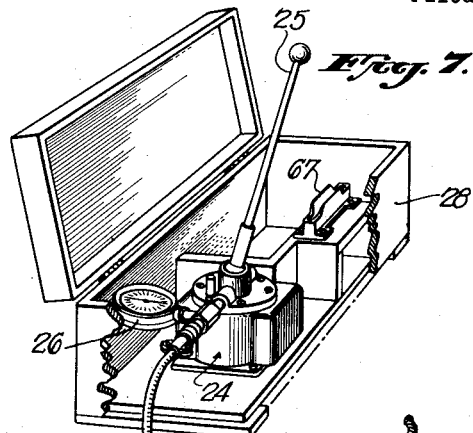
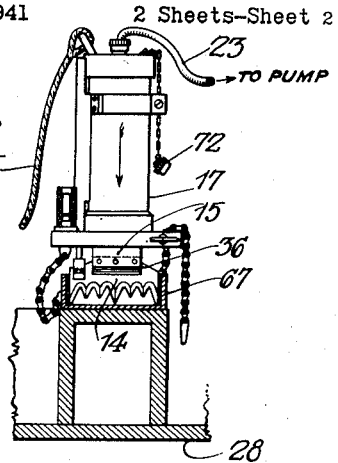
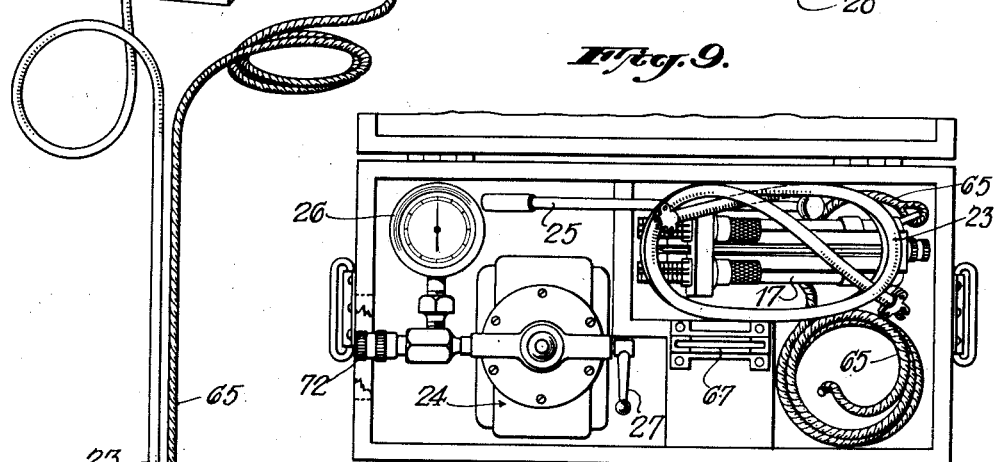
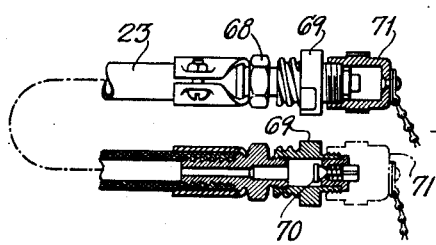
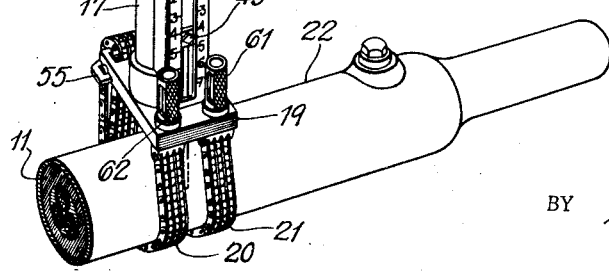
INVENTOR.
CHARLES N. METCALF.
BY Ward Crosby + Neal
ATTORNEYS Patented Apr. 28, 1942

2,281,366

UNITED STATES PATENT OFFICE 2,281,366

CABLE SPEAR

Charles N. Metcalf, Port Chester, N. Y., assignor to Consolidated Edison Company of New York, Inc., New York, N. Y., a corporation of New York Application March 29, 1941, Serial No. 385,955

13 Claims. (Cl. 174—5)

This invention relates to cable spearing apparatus.

Many power cable systems involve more or less complicated networks which have been rearranged from time to time and to which additions have been made over periods of years. Consequently when it is desired to disconnect the power from a particular cable to permit work thereon to be done, it is often difficult to determine with absolute certainty that the cable is dead and therefore safe to be cut by the workman. This problem has led to the use of methods for marking and identifying each cable and the corresponding switches for controlling the power thereto. However, due to the complexities of the cable system and to the fact that changes and additional connections may have been made in emergencies or for other reasons without corresponding accurate records, such marking alone sometimes cannot be relied upon. And of course if through any error or mistake, a workman should cut into a live high tension power cable, the results would very likely be fatal to him. Accordingly to provide absolutely positive assurance that the cable is dead, it is now rather common practice to use some form of apparatus for driving a spear into the cable for contacting with at least one of the conductors so that the spear will ground such conductor to the cable sheath and cause the circuit breakers to open for that cable, in the event the cable should be alive. While various forms of such cable spearing apparatus have normally accomplished the desired results, it has been found that on rare occasions with the cable spears heretofore used, the spear may push aside the insulated conductors especially within the enlarged sleeve section of a cable joint instead of cutting the insulation and grounding one or more of the conductors. One of the purposes of this invention is to provide cable spear apparatus which will avoid this difficulty with certainty.

Other features of the invention involve further improvements enabling the cable spearing apparatus to be more conveniently used with substantially absolute dependability, as well as quickly and inexpensively on cables and cable joints of a variety of types and sizes, including the modern larger sizes as well as smaller and older types.

Various further and more specific objects, features and advantages will clearly appear from the detailed description given below taken in connection with the accompanying drawings which form a part of this specification and illustrate merely by way of example a preferred form of the invention. The invention consists in such novel features, arrangements and combinations of parts as may be shown and described herein.

In the drawings

Fig. 1 is an elevational view, partly in section, showing a preferred form of the cable spearing apparatus constructed in accordance with the present invention and as applied to a cable;

Fig. 2 is another elevational view of the apparatus taken at right angles to the view of Fig. 1;

Fig. 3 is a vertical sectional view taken substantially along the line 3—3 of Fig. 1;

Fig. 4 is a horizontal sectional view taken substantially along the line 4—4 of Fig. 1;

Figs. 5 and 6 are respectively perspective and sectional views showing certain details of the device of Fig. 1;

Fig. 7 is a perspective view of the spearing apparatus in position for use, together with certain accessory equipment;

Fig. 8 is an elevational view of the apparatus in position on a "push back" shoe for returning the blade after use to a retracted position;

Fig. 9 is a view illustrating the manner in which the apparatus and its accessories may be conveniently packed in a portable box or trunk; and Fig. 10 illustrates a preferred form of coupling means for the fluid pressure hose used with the apparatus.

Referring now to the drawings in further detail, in Fig. 1 a multi-conductor cable or cable joint is shown in cross-sectional view at 11, a lead cable sheath or joint sleeve being indicated at 12, and the insulated conductors being indicated at 13.

The spearing apparatus may include a blade 14 mounted at the outer end of a piston rod 15, this rod being attached at its upper end to a piston at 16 (Fig. 3). The piston may be contained within a fluid pressure cylinder as at 17 provided with a removable cylinder head as at 18, and mounted upon a base plate 19.

The base plate 19 is adapted to be detachably connected to the cable as by a chain or chains as at 20, 21 for embracing the cable sheath or the sleeve of a cable joint such as the sleeve 22 (Fig. 7).

The upper end of the cylinder is adapted to be connected through an insulating hose as at 23 with a source of insulating liquid such as oil under high pressure. As indicated in Fig. 7, such source may comprise for example a small portable pump as at 24 of a suitable known type accompanied by or including an oil reservoir and also preferably accompanied in a known way by suitable relief valve means set to release the oil under pressure whenever a predetermined pressure is exceeded, thereby preventing overstressing of the hose line. The pump may also be accompanied by a release valve manually operable as by lever 27 (Fig. 9) for permitting the oil to flow back into the pump reservoir after the cable has been speared. As shown, the pump 24 may be manually operated through suitable mechanism in a known way as by an oscillatable and removable handle 25. Since the features of construction of the pump assembly per se form no part of the present invention and known forms may be used, the same will not be here described in further detail. The pump, together with an accompanying pressure gauge as at 26 may be mounted in a portable box or trunk as at 28 adapted to also carry the remaining parts of the apparatus when not in use. The manner in which the apparatus may be packed into the box is indicated in Fig. 9.

Various parts of the apparatus of Figs. 1–3 will now be described in further detail. As shown, the blade 14 at its edge directed toward the cable may be formed with a row of V-shaped sharpened teeth as at 30, for extending transversely of the cable. Teeth as at 31, 32 at the ends of the blade are preferably formed so as to protrude somewhat in advance of teeth intermediate the ends so that these end teeth will in effect tend to gather in the insulated conductors which are to be cut, whereby if such conductors are deflected from their normal positions, they will be brought into engagement with the intermediate teeth, especially as the conductors are restrained by the cable sheath or joint sleeve together with the supporting action of the encircling chains. Also if desired, one of the central teeth as at 33 may be formed to protrude somewhat in advance of other teeth, but preferably not as far as, and at least no farther than teeth 31, 32. As will be apparent from Fig. 1, the central tooth 33 will ordinarily be the first to engage and pierce the cable sheath, and is in a position to easily start the action of piercing and forming an incision in the sheath. Also this protruding central tooth, if it happens to engage the mid portion of a single conductor, will be in a position to effectively spear the insulation thereon. In the event that none of the more protruding teeth 31—33 should immediately spear the insulation of any of the conductors upon reaching same, the conductors will at least be forced into engagement with one or more of the intermediate teeth as at 30.

The rear edge of the blade may preferably be formed with a number of rearwardly projecting lugs as at 34 adapted to be received in correspondingly shaped slotted portions formed in the lower end of the piston rod 15. These lugs may be secured to the piston rod as by screws 35. It will be further noted that the lower edges of the piston rod at each side of the blade may be formed with tapered surfaces as at 36 merging with the side surfaces of the blade, whereby as the blade enters the cable joint, the lower end of the piston rod is also enabled to easily wedge its way into the incision in the cable joint in following up the blade.

The piston rod 15 is preferably made of a rectangular cross section with the greater dimension of the cross section extending lengthwise of the blade as shown. A piston rod of this rectangular shape makes possible a more compact construction, slidably fitting in the rectangular opening 37 in the base plate 19 and thereby maintaining the necessary alignment of the piston 16 in the cylinder 17 and further acting as a functional part of the spear blade as it is extended from the cylinder. The rectangular shape of the piston rod permits the blade to be conveniently attached in the slotted portions at the end of the rod and which extend generally lengthwise of the blade as well as the rectangular end portion of the rod. The upper end of the piston rod may be secured to the piston head 16 by screws as at 38. The piston may be surrounded by suitable packing rings as at 39 of known form held in place by a threaded clamping ring as at 40.

The base plate 19 may be formed integral with or welded to a retaining ring as at 41 having threaded engagement with the lower end of the cylinder. The base 19 may also be formed integral with or welded to a pair of depending saddle members as at 42. The lower surfaces of these members may be formed with slightly recessed portions as at 43 adapted to securely support the device in proper position against the cylindrical outside surface of the cable sheath or sleeve. It will be noted that the saddle pieces 42 will also serve to provide a housing protecting the blade 14 at times when the latter is in its retracted position.

A suitable scale as at 44 graduated for example in inches, may be mounted vertically along the cylinder 17 for cooperation with an indicating pointer as at 45 for showing the depth of penetration of the blade from its retracted position into the cable being speared. This indicator pointer may be mounted upon a rod as at 46 extending down through an opening in the base 19 as shown, to an attaching lug as at 47 mounted adjacent an outer end portion of the blade 14. With such connection of the indicator directly to the blade, ample insurance is provided that the indicator will accurately show the depth to which the blade has been thrust. Thereby the operators by viewing the indicator may determine whether or not the blade, after operation, has actually penetrated the cable far enough to insure grounding of one or more of the conductors. The indicator scale 44 may be suitably attached to the cylinder as by a clamping ring 48.

As shown in Figs. 1, 2 and 7, the chains 20 and 21 for embracing the cable are preferably of the type adapted to engage sprockets and also as shown, each is preferably formed with several sets of links, for example four, in parallel. This type of chain has been found to be well adapted for closely embracing the cable and to hold the apparatus in stable condition without danger of slippage even though the apparatus may be applied to various cables of widely differing diameters. Also since the two chains 20 and 21 respectively are located parallel to and at opposite sides of the blade 14, they will serve to firmly retain the device against any possibility of slipping or tilting out of proper position when the heavy hydraulic pressure is applied to force the blade into the cable.

One end of each of the chains as at 50 may be formed with a tapered chain tip for convenience in threading the chain through slots as at 51 (Fig. 4) formed in the base plate 19. The slots 51 may be accompanied by latching means comprising rods 52, 52' mounted in the base lengthwise of the slots and each having portions as at 53 normally protruding into the slots to engage links of the chains for locking the chains in place. The rods 52, 52' may also be formed with cutout portions as at 54 so that when the rod is turned to "open" position, the chains are free to pass through the slots 51. As indicated in Fig. 5, the end portions of the rods 52, 52' may be provided with handle portions at 55 for cooperating with adjacent indicator plates as at 56 for showing when each latch is in "open" or "closed" position. The inner ends of the rods 52, 52' may be formed with annular grooves as at 57 adapted to be engaged by retaining pins as at 58 for holding the rods against endwise displacement. Also as shown in Figs. 4 and 6, the inner end portions of each of the rods 52, 52' may be formed with a diametrical drill hole 59 adapted to cooperate with spring pressed balls as at 60 for yieldably retaining the shafts against unintended movement from either the "open" or "closed" positions.

In applying the apparatus to a cable, the cylinder assembly may be first placed with the saddle portions 42 against the cable sheath or joint sleeve. Thereupon with the chains embracing the cable, the chain ends 50 may be threaded through the slots 51 while the latching means is in "open" condition. Then with the chains pulled substantially tight through the slots 51, the latching means may be closed. Thereupon to complete the operations of tightening the chains, knurled finger pieces as at 61, 62 may be turned. These finger pieces are located on the base 19 at the side of the cylinder opposite from the latching means and are adapted to have threaded engagement respectively with suitable lug members as at 63 connected at their lower ends to the chains and passing up through openings in the base 19 into the knurled finger pieces 61, 62 respectively. In short, the slots 51 and the accompanying latching means provide detachable connections for one end of each chain permitting the chain to be adjusted within the limits of the nearest suitable number of links for embracing the cable, and the finger pieces 61, 62 and the lugs therein provide means for more accurately adjusting the chain links and for finally tightening the same.

In operating the equipment which is normally carried from place to place in the box 28 as shown in Fig. 9, the hose 23 may first be coupled at its ends to the cylinder and to the pump as shown in Fig. 7. The box 28 can be positioned at a place remote from the cable, for instance on top of the ground, in case the cable is in a manhole underground. The cylinder assembly may be conveniently lowered into or raised from the manhole as by a rope 65 attached to an eyelet as at 66, affixed to the top of the cylinder head 18. The use of this rope avoids the necessity of suspending the weight of the device by the hose 23. After the device has been lowered into place in the manhole and applied to the cable as shown in Fig. 7, the workman should climb out of the manhole before the device is operated so that if the cable should prove to be alive, the workman will not be endangered by the resulting intense arcing. With the device constructed as above described, and with the proportions as indicated on the drawings, the pump may be operated with the device in place until the oil pressure in the cylinder reaches a predetermined pressure, for example in the neighborhood of 1000 pounds per square inch, as shown by the dial of the indicator 26. After such pressure has been applied, the operator may look down at the indicating means 44, 45 and if this shows that the blade must have penetrated the majority of the distance through the cable or cable joint, then the oil pressure may be released at the pump with assurance that the cable is dead, and the parts of the apparatus may be uncoupled and stowed away in the box. On the other hand, if the cable proves to be alive, the blade will cut into at least one of the cable conductors and serve to ground it in respect to the cable sheath.

Before the hose 23 is actually uncoupled, the cylinder assembly should be applied to a "push back" shoe as at 67 which may be conveniently mounted as shown in the box 28. As appears in Fig. 7, this shoe may be formed with a pair of somewhat flared lip portions for engaging the tapered portions 36 at the lower end of the piston rod 15, thus avoiding any pressure on the sharpened edges of the blade which might dull or damage it. Hence upon pushing down upon the cylinder against the shoe, the piston and attached blade will be thrust back into retracted position in a manner apparent from Fig. 8. The blade and piston will then be in the proper positions for the next use of the device and meanwhile as above stated, the saddle portions 42 will serve as a protective housing for the blade. The "push back" operation will also serve to force most of the oil from the cylinder 17 back through the hose to the pump reservoir.

To protect the workman operating the pump against any danger from the high tension current in the event the cable should be alive, it is apparent that the hose 23 as well as the fluid therein, must comprise insulating material free of any conductive elements or material. It has been a difficult problem to provide a satisfactory fluid medium for operating the piston from a remote point while at the same time providing a flexible hose connection which is a good insulator and able to withstand the heavy pressures involved and without deterioration by the fluid medium. The use of hose with metallic armor, as common for conducting fluid under high pressure, does not provide an entirely satisfactory solution of the problem even if insulating couplings or the like are inserted therein, since the insulating members may be accidentally short-circuited by loops in the armored hose, or after long use arcing across such insulating members might occur in case the cable proved to be carrying high tension current. Consequently, for utmost safety it is advisable to form the hose entirely of insulating material including the reinforcing means therefor. This presents the further problem that if the hose is formed of rubber, it will soon deteriorate in the event oil is used as the fluid pressure medium. While the use of a gaseous medium such as compressed carbon dioxide to provide the fluid pressure has been practised, such an expedient has not proved entirely satisfactory because each operation of the spear involves the trouble and expense of securing an additional quantity of the gas under pressure. Also there is danger of considerable unnoticeable leakage of the gas. The problem has finally been solved by using as the fluid pressure medium, a good grade of light insulating oil and by using a hose formed of oil-resistant artificial rubber composition reinforced with multiple layers of fabric, for example, with five-ply duck reinforcement. The use of insulating oil as the pressure medium has the further advantage as compared with gas pressure, that the operation of the equipment will be substantially the same during cold weather as at other times, whereas with gas at low temperatures, as during winter weather, the pressure may be insufficient for safely operating the device. With such an interconnection between the cable spear and the pumping apparatus, the operator of the pump standing at a safe distance from the cable, is protected against any danger even though the arcing upon spearing a live cable may be so severe as to destroy the cylinder assembly.

A suitable form of quick-detachable coupling means for the hose 23 is shown in Fig. 10 and may include a coupling member as at 68 permanently fixed in the end of the hose and adapted to have threaded connection with coupling members as at 69, containing a small valve as at 70 constructed in known ways permitting the fluid to readily pass through when the coupling is made, with co-acting female ends at the cylinder and at the pump which may be similarly constructed with small valves. The valves in both sections of the couplings closing upon disconnection of the coupling and thereby preventing the oil which is in the hose and in the cylinder from escaping. In this way the hose may normally be kept filled with oil, and little or no oil is lost upon repeated operation of the equipment. Removable caps as at 71 may be applied to the coupling unit 69 after same have been disconnected for preventing dust and dirt from entering the coupling or valve parts. Similar dust caps as at 72 may be provided at the oil inlet to the cylinder as well as to the outlet of the pump.

While the invention has been described in detail with respect to a particular preferred example, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. Apparatus for spearing power cables, comprising a fluid pressure operated piston, a cylinder therefor, a serrated blade connected to said piston, means for removably securing said cylinder in respect to a cable with said blade directed toward the cable, including a sprocket chain for extending from one side of the piston, around the cable, to an opposite side of the piston, chain attaching means at said first-named side of the piston, having provision for adjustment of the number of links of the chain which are to embrace the cable, and attaching at said opposite side having provision for tightening the chain around the cable.

2. Apparatus for spearing power cables, comprising a fluid pressure operated piston, a cylinder therefor, a spearing blade secured in respect to said piston, and means for removably securing said cylinder in respect to a cable with said blade directed toward the cable, including a sprocket chain for embracing the cable and attached at its ends to said cylinder.

3. Apparatus for spearing power cables, comprising a fluid pressure operated piston, a cylinder therefor, a spearing blade secured in respect to said piston, means for removably securing said cylinder in respect to a cable with said blade directed toward the cable, including a sprocket chain for embracing the cable, and quick-detachable latching means for engaging any link of the chain for securing same in respect to the cylinder.

4. Apparatus for spearing power cables, comprising a fluid pressure operated piston, a cylinder therefor, a spearing blade secured in respect to said piston and adapted to extend transversely of the cable, and means for removably securing said cylinder in respect to the cable with said blade directed toward said cable, including a pair of sprocket chains for embracing the cable respectively at each side of said blade, said chains being attached at their ends in respect to said cylinder.

5. Apparatus for spearing power cables, comprising a blade formed with a plurality of V-shaped teeth having cutting edges and arranged in a row, means for mounting said blade for transversely engaging the cable, and liquid pressure-operated piston means for forcing said blade into the cable, under sustained pressure.

6. Apparatus for spearing power cables, comprising a blade formed with a plurality of V-shaped teeth having cutting edges and arranged in a row, and with teeth at the ends of said row projecting in advance of teeth intermediate said ends, means for mounting said blade for transversely engaging the cable and fluid pressure-operated piston means for forcing said blade into the cable, under sustained pressure.

7. Apparatus for spearing power cables, comprising a blade formed with a plurality of V-shaped teeth having cutting edges and arranged in a row, and with teeth at the middle and ends of said row projecting in advance of remaining teeth, means for mounting said blade for transversely engaging the cable and fluid-pressure-operated piston means for forcing said blade into the cable, under sustained pressure.

8. Apparatus for spearing power cables, comprising an elongated sharpened blade for transversely engaging the cable, and fluid pressure-operated piston means for forcing said blade into the cable, including a piston rod of generally rectangular cross section, and a corresponding rectangular guiding means for said rod, said blade being fixed upon the outer end of said rod lengthwise of the larger cross-sectional dimension of the rod.

9. Apparatus for spearing power cables, comprising an elongated sharpened blade for transversely engaging the cable, and fluid pressure-operated piston means for forcing said blade into the cable, including a piston rod of generally rectangular cross section, said rod being slotted at its outer end lengthwise of its larger cross-sectional dimension, to receive said blade, and sides of the rod at said end being tapered to respectively merge with the blade surfaces, whereby the end portion of the rod may follow the blade in penetrating the cable.

10. Apparatus for spearing power cables, comprising a fluid pressure-operated piston, a cylinder therefor, a spearing blade secured in respect to said piston by a piston rod, a base plate upon which said cylinder is mounted and through which said rod is slidably received, and saddle pieces mounted on the outside of said base plate at each side of the path of the piston, said pieces being formed with recesses adapted to engage portions of the outside surface of the cable, said blade and piston rod also being so constructed and arranged with respect to said pieces that the space therebetween serves as a housing for the blade when in retracted position.

11. Apparatus for spearing power cables, comprising a fluid pressure-operated piston, a cylinder therefor, a spearing blade secured in respect to said piston by a piston rod, and saddle means secured in respect to the base portion of the cylinder and having recessed portions for engaging portions of the outside surface of the cable, said blade and piston rod also being so constructed and arranged with respect to said saddle means that the latter serves as a housing for the blade when in retracted position.

12. Apparatus for spearing power cables, comprising a fluid pressure-operated piston, a cylinder therefor, a spearing blade secured in respect to said piston by a piston rod, a base plate upon which said cylinder is mounted and through which said rod is slidably received, means on said base plate for adjustably attaching chain means for embracing the cable, and further means on said plate for engaging portions of the cable surface and also serving as a housing for the blade when retracted.

13. Apparatus for spearing high tension power cables, comprising an oil pressure-operated piston, a cylinder therefor, a spearing blade secured in respect to said piston, insulating means for conducting oil under high pressure to and from a remote point, and to and from said cylinder, for operating said piston, including a hose formed of artificial rubber reinforced with multi-ply fabric and coupled at one end to said cylinder, and a high pressure pump with accompanying oil reservoir coupled to the other end of said hose.

CHARLES N. METCALF.